A. K. HAINES.
CLIMETER.
APPLICATION FILED FEB. 15, 1919.
1,405,841.
Patented Feb. 7, 1922.
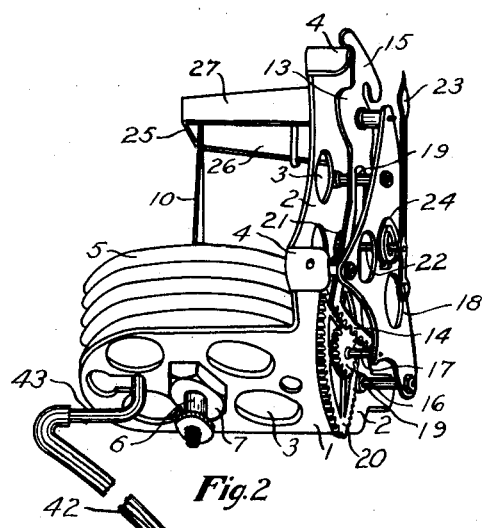
Fig. 2
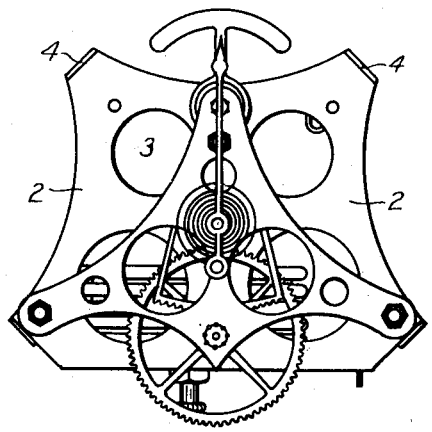
Fig. 3
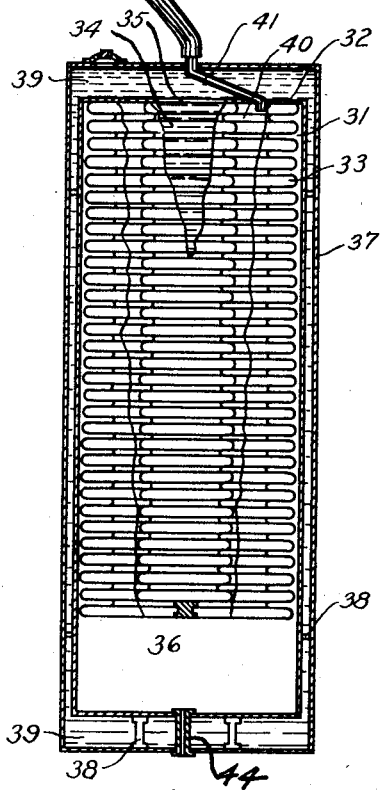
Fig. 1
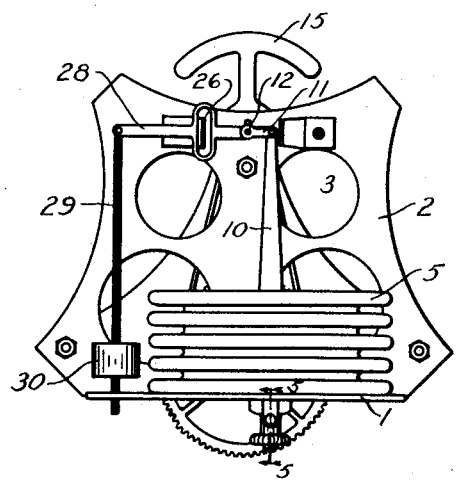
Fig. 4
Fig. 5
Inventor
Allen K. Haines
per Robert H. Young
Attorney

UNITED STATES PATENT OFFICE.

ALLEN K. HAINES, OF EAST ST. LOUIS, ILLINOIS.

CLIMETER.

1,405,841.　　　Specification of Letters Patent.　　Patented Feb. 7, 1922.

Application filed February 15, 1919. Serial No. 277,305.

*To all whom it may concern:*

Be it known that I, ALLEN K. HAINES, a citizen of the United States, residing at East St. Louis, in the county of St. Clair and State of Illinois, have invented certain new and useful Improvements in Climeters, of which the following is a specification.

It has been found by those practicing the art of flying, to be of great importance under certain conditions to be able to ascertain at any instant whether the flying device is ascending or descending and also to determine the rate of such ascent or descent.

In cloud flying and night flying such a device is of importance. In the performance testing of airplanes such an instrument would enable the pilot in a climbing test to maintain at all times the maximum rate of climb. It would also enable him to fly level, indicating instantly any tendency to ascend or descend. Such devices as barometers with gears to multiply their sensitiveness and multiple scale dials have been tried for this purpose but have been found unsatisfactory due to the fact that the pressure of the atmosphere does not vary directly with the altitude thus causing unequal changes in readings for the same rate of change of altitude when different altitudes are taken as the starting point of such change. Furthermore devices of this nature have been subject to inaccuracies due to the inertia changes of the mechanical parts due to the motion of the flying device and in corrections due to temperature changes at changing altitudes. It is my aim to correct these faults in the device disclosed in the following specification.

This invention relates to a device, known as a climeter, for indicating the rate of climb or rate of descent, of an airship.

The instrument comprises essentially an element responsive to changes in the atmospheric pressure, the atmospheric pressure increasing or decreasing in proportion to the rate of descent or ascent. This pressure responsive element is a body of suitable gas such as air, enclosed in a flexible casing, which casing is provided with a very small opening to the outside air. The expansion and contraction of the pressure responsive element actuates a suitable indicator to show the rate of ascent or descent.

As the airship on which the instrument is carried climbs, the external air pressure decreases, the pressure responsive element expands, due to the air contained therein, and the pointer moves accordingly. As soon as the airship ceases climbing or descending, the air pressure within the pressure responsive element becomes the same as the atmospheric pressure, by the flow of air inwardly or outwardly, as the case may be through the mentioned small opening.

A body of confined air is obviously affected by temperature change to change its pressure. Rather extreme temperature changes are met with in aeronautic work, and it is obviously necessary, in an instrument of this character, to compensate for these changes. It is accordingly an important object of this invention to provide a climeter which is entirely unaffected by temperature, that is to say, which is thermostatically neutral.

It is a further object of this invention to balance certain parts against centrifugal and inertia forces commonly met with in an airplane.

It is a further object of this invention to provide a compact instrument, containing the necessary gearing to multiply the small movements of the pressure responsive element to give a suitably sensitive indicator reading, which instrument may further be readily mounted on the instrument board of an airplane.

Other objects and advantages will appear as the description proceeds.

In the drawings illustrating one embodiment of my invention, and in which similar reference characters indicates similar parts, Figure 1, indicates the thermostatically neutral air tank; Figure 2, indicates the instrument proper in perspective; Figure 3, is a front view of the same; Figure 4, is a rear view of the same and Figure 5, is a section on the line 5—5 of Figure 4.

Referring now to Figure 2, showing the instrument proper the frame of the instrument is composed of a bent plate comprising plates 1 and 2, bent substantially at right angles and provided with suitable lightening holes 3. The plate 2, may be provided with lugs 4, to fasten to instrument case, not shown.

5 indicates the pressure responsive element. It consists essentially of a cylinder provided with very deep transverse corrugations, commonly known as a sylphon. The sylphon 5, is held in place on the plate 1, by rod 6, that engages with the sylphon and passes out through the plate 1, being held in place by the nut 7. The rod 6, is hollow, carrying the opening 8, which communicates with the interior of the sylphon. The other end of the opening 8, is controlled by a needle valve 9, of any conventional type, to provide a very small opening from the interior of the sylphon to the atmospheric air.

Obviously as the airplane rises or descends the sylphon 5, will expand or contract, because the opening 8, is so restricted that the pressures within the sylphon and outside thereof will not instantaneously equalize. This expansion or contraction will evidently be substantially proportional to the rate of climb or descent of the airplane and may be multiplied to give a fairly sensitive device. A rather high multiplication has been found necessary to secure a practical instrument.

This multiplication will now be described. The sylphon 5, has attached thereto an arm 10, which is pivoted to a crank 11. Crank 11, is rigid with a shaft 12, which extends through the plate 2, and has fixed thereon the segment 13, which carries the segmental gear 14. Gear 14, is balanced by the counter weight 15. The parts 13, 14 and 15, are all in one piece.

Gear 14, meshes with a small gear 16, mounted on a shaft 17, which shaft 17 is mounted at one end of the plate 2 and at its other end in the plate 18. Plate 18, is substantially parallel to the plate 2 and is supported thereon by lugs 19.

A large gear wheel 20, is rigidly mounted on this shaft 17, and meshes with a small gear wheel 21, mounted on a shaft 22, carried by the plate 2 and 18. The shaft 22, carries the pointer 23, which may move over a suitably calibrated scale, not shown. A hair spring 24, may be used to assist in bringing the pointer 23, back to the neutral position after deflection. Evidently expansion of the sylphon will, through the arm 10, crank 11, shaft 12, gears 14, 16, 20 and 21, actuate the pointer 23.

The shaft 12, is supported at one end in the plate 2, and at its other end in the plate 25, supported by the two legs 26 and 27, carried by plate 2. In order to counteract the tendency of centrifugal force to expand and contract the sylphon 5, when the airplane is looping or making turns, the following parts are used. Rigidly carried on the shaft 12, is an arm 28, which straddles the leg 26, as shown in Figure 4. The arm 28, is pivoted to a rod 29, the end of which passes loosely through a small hole in the plate 1. Mounted on the rod 29, is a weight 30, the moment of combined weights of the rod 29 and 30, being substantially equal to the moment of combined weights of the sylphon 5, and arm 10. A balance is thereby attained so that centrifugal forces tending to expand or contract the sylphon are counter-acted by the forces exerted on the sylphon by the rod 29 and weight 30.

From the operation as described above it will be readily seen that the pilot of an airplane can by moving his elevator controls and watching the resulting action of the indicator easily ascertain that angle of attack which will give him greatest divergency of the indicator on the dial and hence the greatest rate of climb. It is also seen how he will be enabled to fly level or at any approximate intermediate rate of climb by similarly observing said indicator.

The instrument thus far described would make a satisfactory climeter if it were always at the same temperature. Since however extreme temperature changes are met with in aeronautic work, it is an important object of this invention to properly compensate for temperature.

To this end, there is provided a cylinder 31, which has attached to its upper wall 32, a metallic, transversely corrugated, longitudinally expansible element 33, commonly known as a sylphon. Arranged within the sylphon 33, and attached to the top 32, of the cylinder 31, is another sylphon 34, the latter sylphon being in registry with an opening 35 in the top 32. The bottom of the inner sylphon 34, bears against the bottom of the outer sylphon 33, so that expansion and contraction of the inner sylphon will cause a corresponding expansion and contraction of the outer sylphon. A lug 36, is used to attach the bottoms of the sylphons together.

Completely enclosing the cylinder 31, is a casing 37 attached to and spaced from the cylinder 31, by lugs 38. The space 39, between the cylinder 31, and casing 37, is in communication, through the opening 35, with the inner sylphon 34, but is not in communication with the outer sylphon 33. This space 39, as well as the interior of the inner sylphon 34, is filled with a fluid having a known co-efficient of expansion, preferably some such liquid as kerosene, or alcohol.

The space between the inner and outer sylphons contains air at atmospheric pressure. This space designated 40, is in communication by a pipe 41, a connecting tube 42, and a pipe 43, with the interior of the sylphon 5. Evidently any change of air pressure in the space 40, will be communicated to the sylphon 5.

The parts just described operate as follows: upon an increase of temperature the liquid in the space 39 expands to cause an expansion of the inner sylphon 34. This causes an expansion of the outer sylphon 33, which expands just enough to cause a decrease in pressure in the space 40, just sufficient to counteract the increase in pressure generated in the sylphon 5, and space 40, that the increase in temperature would tend to cause. In other words the sylphons 33, and 34, are so designed with relation to the air in the space 40, as well as the air in the sylphon 5, that no change in pressure is occasioned by a change in temperature. The instrument is then thermostatically neutral.

While I have illustrated a particular embodiment of my invention, it should be understood that the invention may be carried out in other ways than in the precise instrument illustrated, as defined within the scope of the following claims.

I claim:

1. In a device of the character described, an air tank which is volumetrically unresponsive to temperature changes, pressure responsive means connected thereto, means provided with a small orifice associated with the said pressure responsive means, an indicating means operated by said pressure responsive means.

2. The combination as claimed in claim 1, said orifice carrying means being adjustable to vary the size of said orifice.

3. In a device of the character described for use on aircraft, an air tank which is volumetrically unresponsive to temperature changes, pressure responsive means connected thereto, means provided with a small orifice associated with said pressure responsive means, in combination with means associated with said pressure responsive means to compensate for the effect of any centrifugal forces due to any sudden change of direction of the aircraft.

4. In a device of the character described, an expansive air tank and thermally responsive means associated with said air tank to change its volume so as to keep the air pressure substantially constant in said tank with varying temperature.

5. In a device of the character described, an expansible air tank, an expansible fluid tank associated with said air tank so that the expansion and contraction of the fluid tank due to temperature change will expand and contract the air tank so that the air pressure therein remains substantially constant, with varying temperature.

6. In a device of the character described, an expansible air tank, an expansible tank for another fluid, said fluid having a different coefficient of expansion from air, the two tanks being associated so that the expansion and contraction of the fluid tank, with varying temperature, causes such an expansion and contraction of the air tank that the air pressure in said tank is not affected by change in temperature.

7. In a device of the character described, an expansible air tank, an expansible fluid tank mounted inside of said air tank, the two being associated so that expansion and contraction of the fluid tank with varying temperature will cause expansion and contraction of the air tank.

8. In a device of the character described, pressure responsive means, indicating means operated thereby, an air tank of variable volume, designed to change its volume with varying temperature, means to connect said pressure responsive means to said tank, the combined volume of the pressure responsive means and the tank being such that the air pressure in the two remains substantially constant with varying temperature.

9. In a device of the character described, pressure responsive means, indicating means operated thereby, an air tank of variable volume, designed to expand upon increase of temperature and contract upon decrease in temperature, means to connect said pressure responsive means to said tank, the combined volume of the pressure responsive means and the tank being such that the air pressure in the two remains substantially constant with varying temperature.

In testimony whereof I affix my signature.

ALLEN K. HAINES.